(12) United States Patent
Berg et al.

(10) Patent No.: US 8,291,998 B1
(45) Date of Patent: Oct. 23, 2012

(54) FURROW CLOSING WHEEL ASSEMBLY

(76) Inventors: Kevin J. Berg, Sioux Falls, SD (US);
David Terveen, Emery, SD (US)

( * ) Notice: Subject to any disclaimer, the term of this patent is extended or adjusted under 35 U.S.C. 154(b) by 177 days.

(21) Appl. No.: 12/813,306

(22) Filed: Jun. 10, 2010

Related U.S. Application Data

(60) Provisional application No. 61/220,700, filed on Jun. 26, 2009.

(51) Int. Cl.
*A01B 59/00* (2006.01)
(52) U.S. Cl. .................. 172/604; 172/173; 172/540
(58) Field of Classification Search .............. 172/64, 172/173, 176, 540, 554, 604; D15/29
See application file for complete search history.

(56) References Cited

U.S. PATENT DOCUMENTS

| | | | | |
|---|---|---|---|---|
| 874,268 A * | 12/1907 | Waterman | | 172/556 |
| 895,230 A * | 8/1908 | Beier | | 172/554 |
| 903,119 A * | 11/1908 | Waterman | | 172/556 |
| 1,103,938 A * | 7/1914 | Campbell | | 172/252 |
| D104,018 S * | 4/1937 | Cole | | D15/29 |
| 2,146,222 A * | 2/1939 | Pace | | 172/539 |
| 2,271,354 A * | 1/1942 | Strandlund | | 172/556 |
| D137,446 S * | 3/1944 | Schmeiser | | D15/29 |
| D138,712 S * | 9/1944 | Karl | | D15/29 |
| 3,297,096 A * | 1/1967 | Wooldridge | | 172/464 |
| 4,098,349 A | 7/1978 | Jilani | | |
| 4,158,392 A * | 6/1979 | Belanger | | 172/548 |
| D338,898 S * | 8/1993 | Corcoran et al. | | D15/28 |
| 5,497,717 A | 3/1996 | Martin | | |
| 5,628,372 A * | 5/1997 | Creyke | | 172/534 |
| 5,819,855 A | 10/1998 | Tarver | | |
| 5,896,932 A | 4/1999 | Bruns | | |
| 6,119,608 A | 9/2000 | Peterson | | |
| 6,314,897 B1 | 11/2001 | Hagny | | |
| 6,378,622 B1 | 4/2002 | Kostrum | | |
| 6,425,445 B1 | 7/2002 | Tarver | | |
| 6,530,334 B2 | 3/2003 | Hagny | | |
| 6,907,833 B2 | 6/2005 | Thompson | | |
| 7,588,090 B2 * | 9/2009 | Dairon et al. | | 172/123 |
| D617,817 S * | 6/2010 | Brockway | | D15/28 |
| 7,730,961 B2 * | 6/2010 | Ward et al. | | 172/537 |
| 7,810,580 B2 * | 10/2010 | Swanson | | 172/604 |

* cited by examiner

*Primary Examiner* — Jamie L McGowan

(57) ABSTRACT

A furrow closing wheel assembly includes a closed loop that has an inner surface, an outer surface, a first lateral surface and a second lateral surface. Each of the first and second lateral surfaces has a channel therein. Flanges positioned on a hub are extendable into the channels to couple the hub to the loop. A plurality of teeth extends upwardly from the outer surface. Each of the teeth has a front face, a rear face, a first side, a second side and an apex positioned distal to the loop. Each the front faces is faceted such that the front faces are absent of a substantial planar surface lying in a plane that is orientated parallel to an axis of rotation of the loop. The front face of each of the teeth is a leading face of the teeth extending into soil when the loop is positioned on the hub.

8 Claims, 5 Drawing Sheets

FURROW CLOSING WHEEL ASSEMBLY

This application is a continuation of provisional application 61/220,700 filed Jun. 26th 2009.

BACKGROUND OF THE DISCLOSURE

Field of the Disclosure

The disclosure relates to furrow closing devices and more particularly pertains to a new furrow closing device for closing a furrow in an efficient manner.

SUMMARY OF THE DISCLOSURE

An embodiment of the disclosure meets the needs presented above by generally comprising a closed loop that has an inner surface, an outer surface, a first lateral surface and a second lateral surface. The inner surface forms a circle. The closed loop has a pair of channels therein. Each of the first and second lateral surfaces has one of the channels therein extending along and is coextensive with a respective one of the first and second lateral surfaces. Flanges positioned on a hub are extendable into the channels to couple the hub to the loop. A plurality of teeth is attached to and extends upwardly from the outer surface. The teeth are spaced from each other and positioned around the loop. Each of the teeth has a front face, a rear face, a first side, a second side and an apex positioned distal to the loop. Each the front faces is faceted such that the front faces are absent of a substantial planar surface lying in a plane that is orientated parallel to an axis of rotation of the loop. The substantial planar surface is a surface with a width greater width than 0.10 inches and a height greater than 0.30 inches. The front face of each of the teeth is a leading face of the teeth extending into soil when the loop is positioned on the hub.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
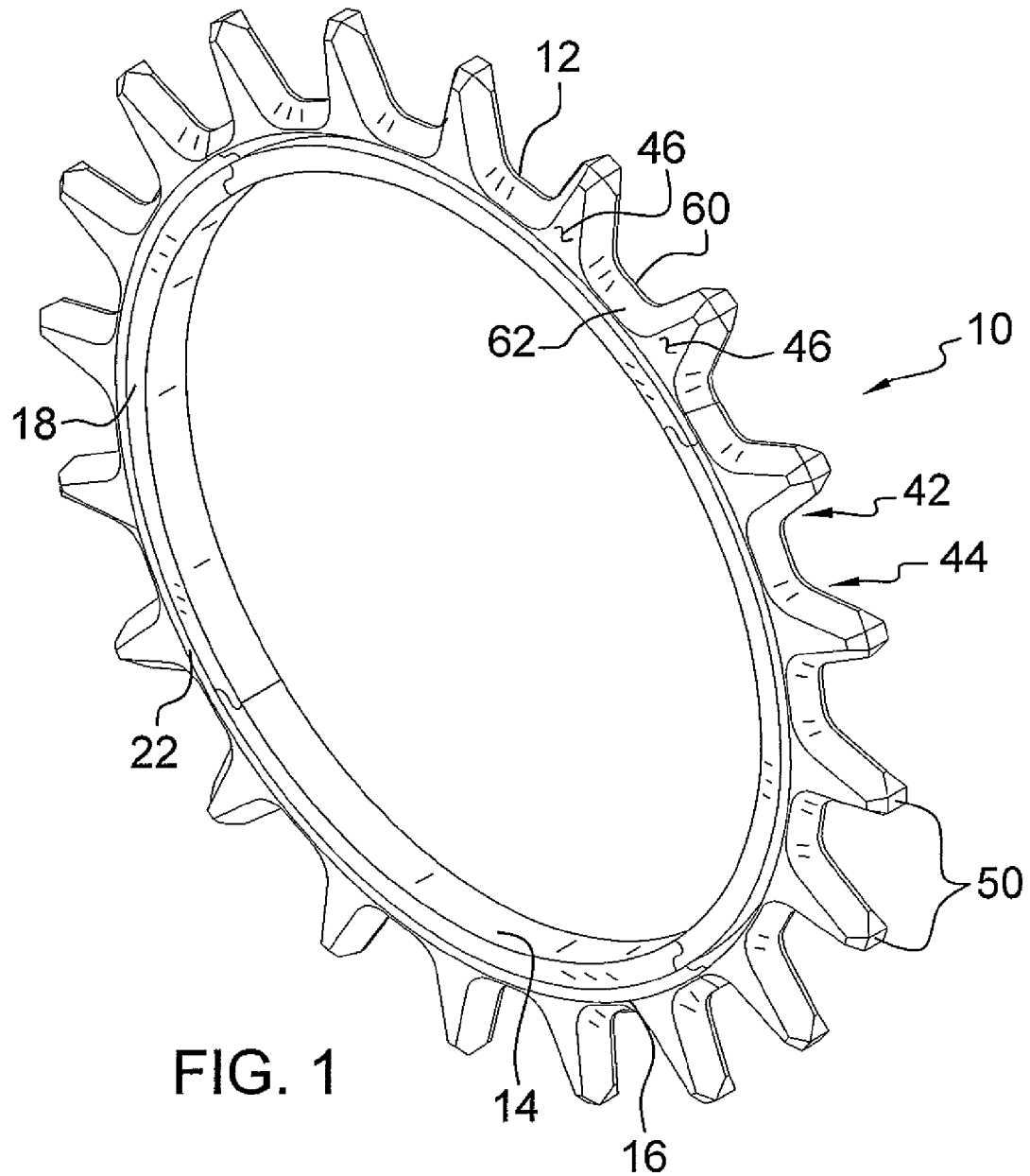
FIG. 1 is a perspective view of a furrow closing wheel assembly according to an embodiment of the disclosure.
Figure 3:
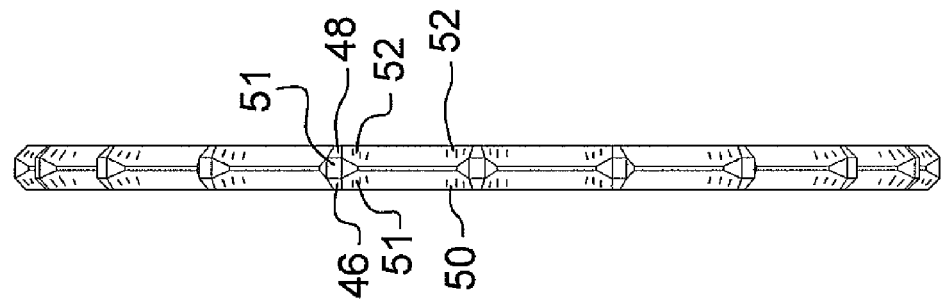
FIG. 3 is a front view of an embodiment of the disclosure.
Figure 2:
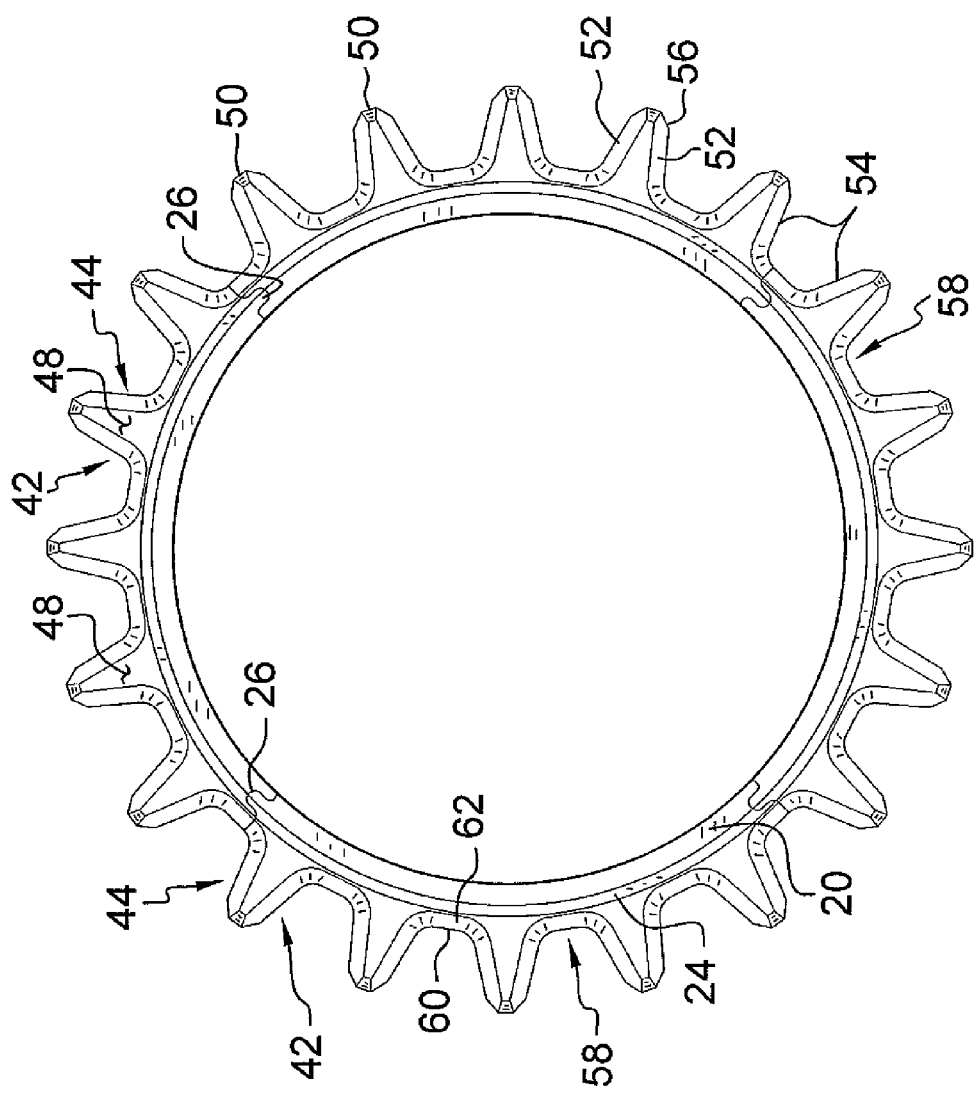
FIG. 2 is a side view of an embodiment of the disclosure.
Figure 4:
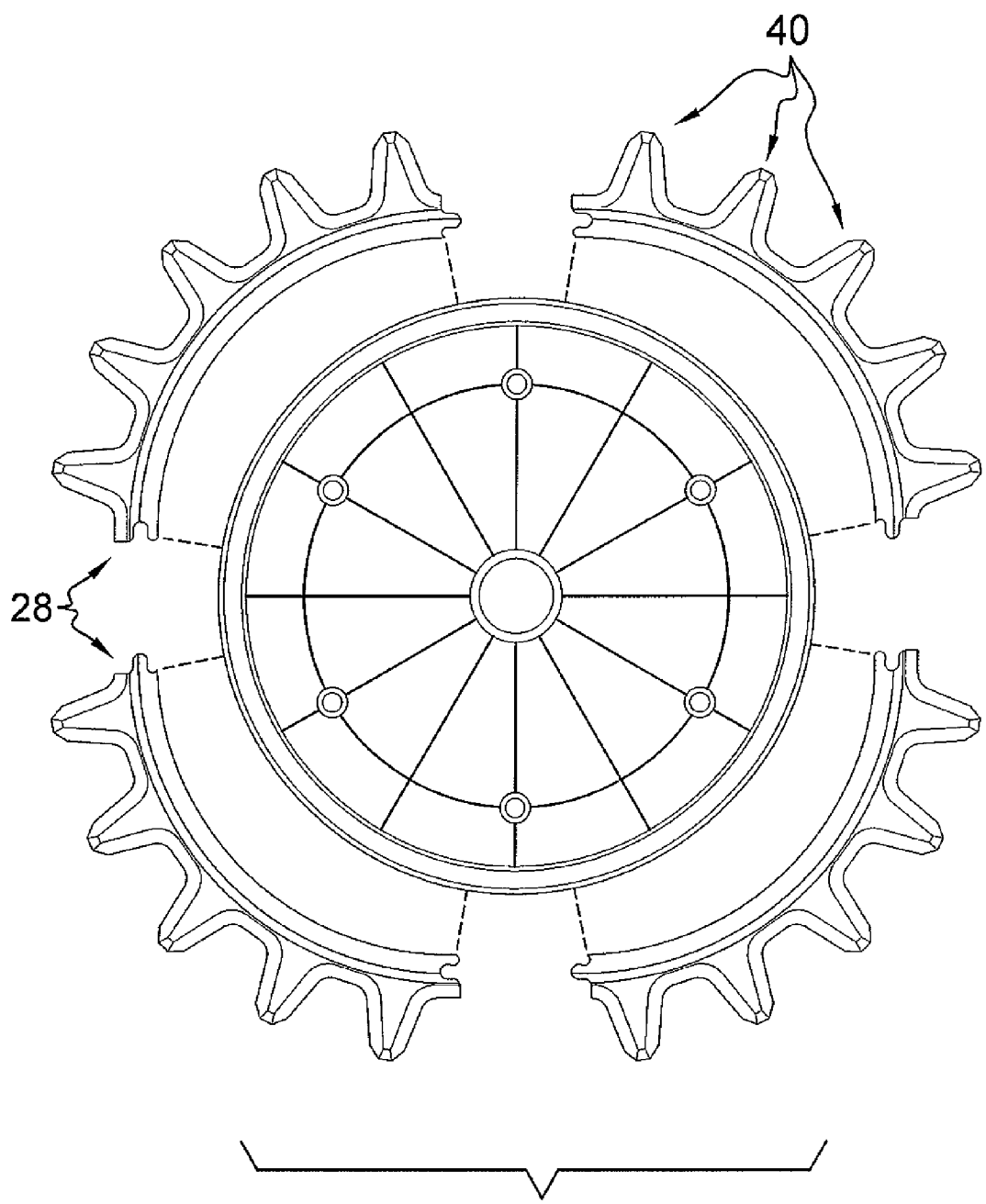
FIG. 4 is a side exploded view of an embodiment of the disclosure.
Figure 5:
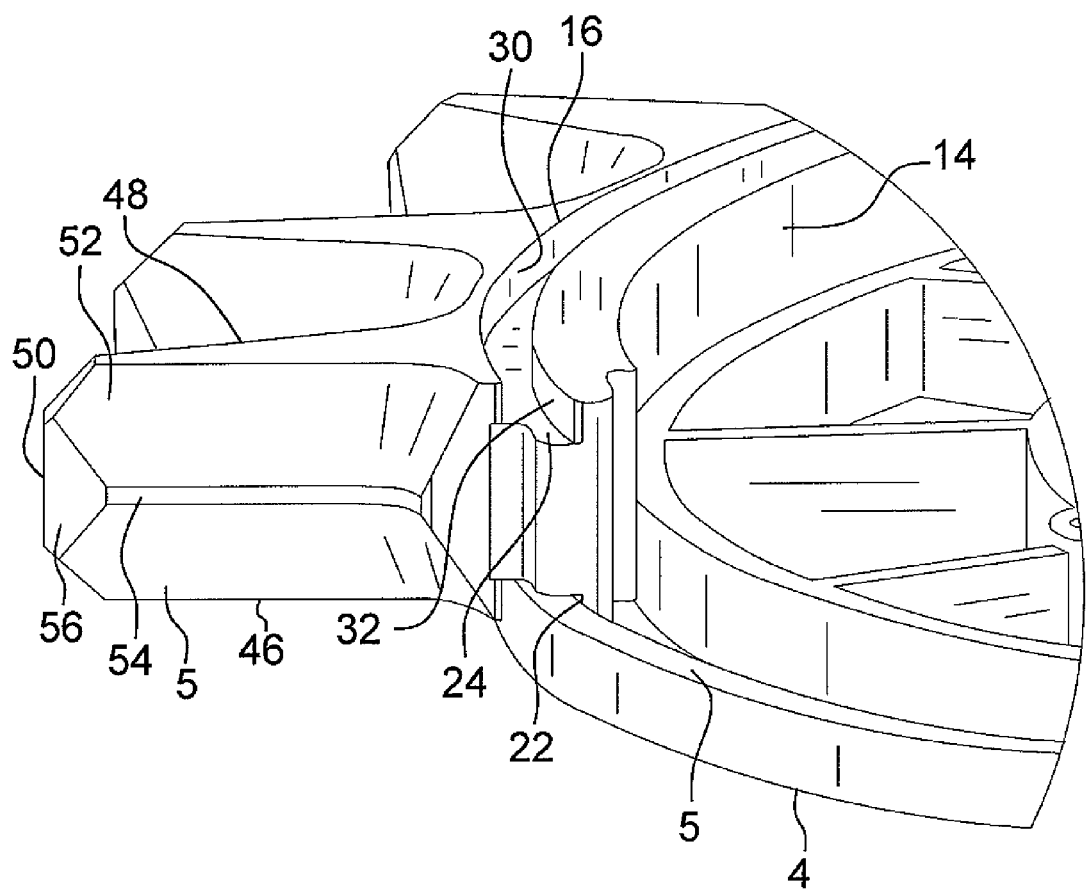
FIG. 5 is an enlarged perspective view of an embodiment of the disclosure.
Figure 6:
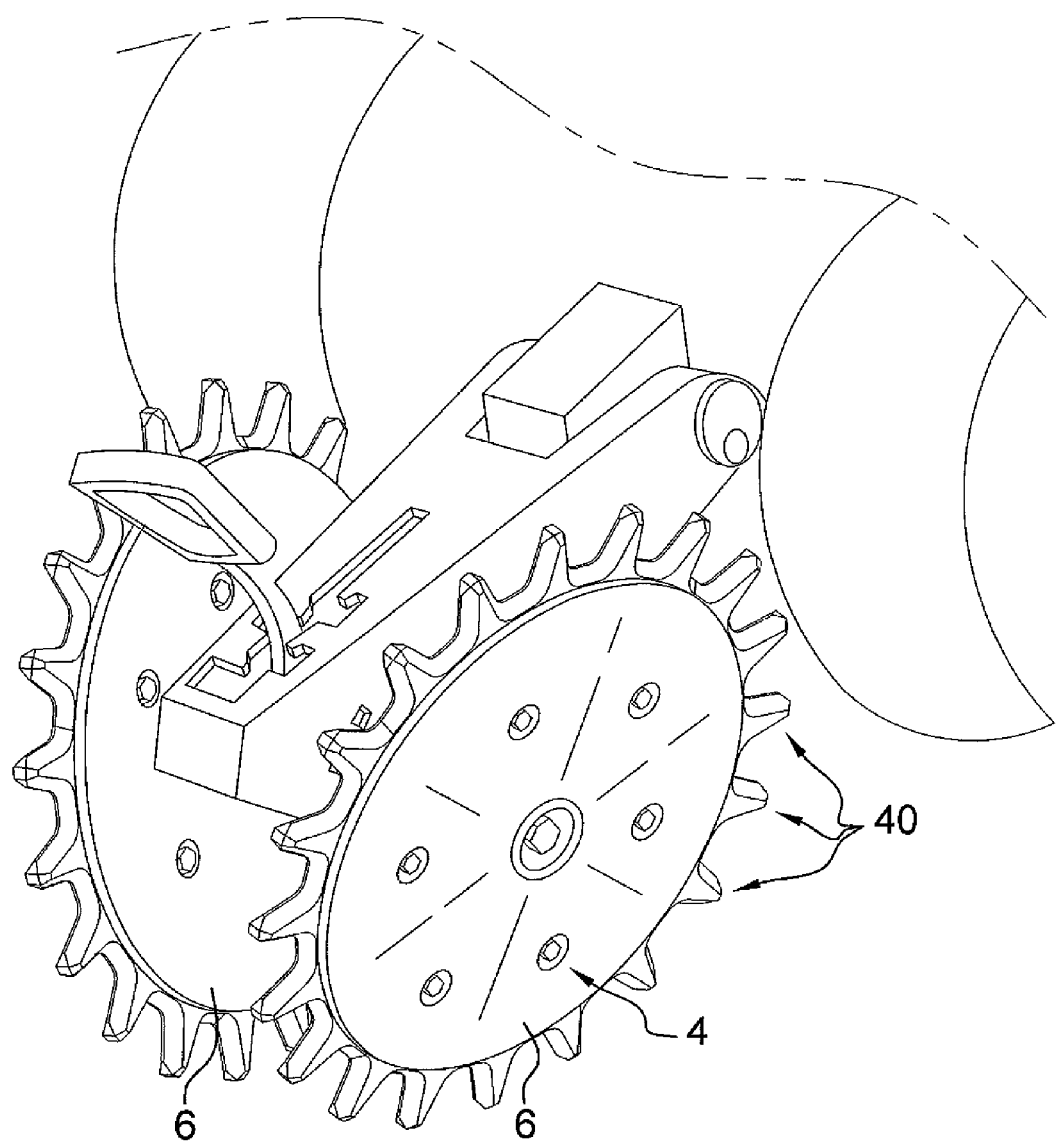
FIG. 6 is a perspective in-use view of an embodiment of the disclosure.

With reference now to the drawings, and in particular to FIGS. 1 through 6 thereof, a new furrow closing device embodying the principles and concepts of an embodiment of the disclosure and generally designated by the reference numeral 10 will be described.

As best illustrated in FIGS. 1 through 6, the furrow closing wheel assembly 10 generally comprises a closed loop 12 that has an inner surface 14, an outer surface 16, a first lateral surface 18 and a second lateral surface 20. The inner surface 14 forms a circle. The closed loop 12 has a pair of channels therein 22, 24. Each of the first 18 and second 20 lateral surfaces has one of the channels 22, 24 therein extending along and coextensive with a respective one of the first 18 and second 20 lateral surfaces. Flanges 5 positioned on a hub 4 are extendable into the channels 22, 24 to couple the hubs to the loop. The hub 4 may include a pair of panels 6 attached together to retain the loop 12 in place. The channels 22, 24 may be a same distance from the inner surface 14 with respect to each other so that they line up with reach other from one side of the loop 12 to the other. A distance between the channels 22, 24 may be equal to between 0.40 inches and 0.60 inches. Perimeter lips, not shown, may be attached to the first 18 and second 20 lateral surfaces adjacent to the outer surface 16 to extend over and protect the hub 4.

The loop 12 may be formed of any conventional material though it has been found that an ultra high molecular weight plastic works well for the intended purposes. The loop 12 may have a plurality of breaks 26 therein dividing the loop 12 into a plurality of sections 28. The sections 28 are frictionally coupled together to allow the sections 28 to be removed from each other. The frictional engagement may include a snap fitting. Sections 28 may be formed, as opposed to a solid loop, for more economical construction of the loop as well as to assist a person in mounting the loop 12 on the hub 4, however a single solid loop will work also. The inner surface 14 forms a circle that may have a radius approximately between 4.75 inches and 5.10 inches and in particular may have a size to fit the hub 4. The channels 22, 24 have an distal edge 30 and a proximal edge 32 with respect to the inner surface 14. The proximal edge 32 forms a circle that may have a radius between 5.16 inches and 5.24 inches and the distal edge 30 forms a circle that may have a radius between 5.32 inches and 5.40 inches. More typically, the inner surface 14 may have a radius equal to approximately 4.92 inches to 4.94 inches, the proximal edge 32 may have a radius between 5.19 inches and 5.21 inches and the distal edge 30 may have a radius between 5.35 inches and 5.37 inches. This will form a channel 22, 24 that will generally have a height between 0.14 inches and 0.18 inches.

A plurality of teeth 40 is attached to and extends upwardly from the outer surface 16. The teeth 40 are spaced from each other and positioned around the loop 12. The loop 12 may have between fourteen and twenty-four teeth 40 therein. Each of the teeth 40 has a front face 42, a rear face 44, a first side 46, a second side 48 and an apex 50, wherein the apex 50 is positioned distal to the loop 12. Each of the rear 44 and front 42 faces is faceted such that each of the rear 44 and front 42 faces are absent of a substantial planar surface lying in a plane that is orientated parallel to, and therefore does not intersect, an axis of rotation of the loop 12. The substantial planar surface is a surface with a width greater width than 0.10 inches and a height greater than 0.30 inches. The width is measured along a line extending between the first 18 and second 20 lateral surfaces and the height is measured along a line being co-linear with a radius of the loop 12. The axis of rotation is also the axis of the loop 12 and therefore a plane of the loop 12 is itself perpendicular to the axis of rotation. Consequently, the teeth 40 have no substantial planar surfaces are orientated perpendicular to the plane of the loop 12. The front face 42 of each of the teeth 40 is a leading face of the teeth 40 extending into soil first when the loop 12 is positioned on the hub 4. However, one advantage of the assembly 10 is that it is that the loop 12 may be rotated 180° and remounted on the hub 4 such that the rear face 44 will then define the front face. Additionally, since the hub 4 is angled there will tend to be more wear on one of the first 46 or second 48 sides before the other, the loop may be flipped 180° to reposition the first 46 and second 48 sides with respect to the hub 4.

Each of the front 42 and rear 44 faces includes a set of soil engaging surfaces. Each set includes a first facet 51 abutting the first side 46 and a second facet 52 abutting the second side 48. The first 51 and second 52 facets extend toward each other and intersect a third facet 54. The first 51 and second 52 facets is angled away from the third facet 54 at an angle greater than 45°. This angle may be 60°. An apical facet 56 extends downwardly toward the loop 12 and outwardly from the apex 50 to intersect the first 51, second 52 and third 54 facets. Each of the teeth 40 may have a height between 0.75 inches and 2.0 inches. The first 51 and second 52 facets are substantial planar surfaces angled away from the plane of the loop 12 and the axis of rotation. The third 54 and apical 56 facets may lie in planes orientated perpendicular to the plane of the loop 12, however, neither forms a substantial planar surface as defined above.

A juncture 58 is positioned between and extends between each pair of adjacent ones of the teeth 40 such that a plurality of junctures 58 is defined. Each of the junctures 58 is a raised area extending between respective ones of the teeth. The raised area of each of the junctures 58 has lateral edges 60 that are angled down from a central ridge 62 extending along the raised area.

In use, the loop 12 is placed on a conventional hub 4 of a device used to close furrows after seeds are deposited into the furrow. The channels 22, 24 on the loop 12 allow for retrofitting of existing hubs 4 with the assembly 10. The teeth 40 are faceted, or chamfered, in such a manner that the teeth 40 easily shed soil to provide more efficient movement of the soil. Because the teeth 40 do not become clogged with soil, they more aggressively close the furrow so that the furrow does not re-open. Finally, the teeth 40 loosen the sidewalls of the soil around the furrow to promote stronger and better root development.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A furrow closing wheel attachment apparatus for positioning on a hub of a furrow closer, said apparatus comprising:
   a closed loop having an inner surface, an outer surface, a first lateral surface and a second lateral surface, said inner surface forming a circle having a size configured to be engageable with the hub, said closed loop having a pair of channels therein, each of said first and second lateral surfaces having one of said channels therein extending along and being coextensive with a respective one of said first and second lateral surfaces, wherein flanges positioned on the hub are extendable into said channels to couple the hub to said loop;
   a plurality of teeth being attached to and extending upwardly from said outer surface, said teeth being spaced from each other and positioned around said loop, each of said teeth having a front face, a rear face, a first side, a second side and an apex positioned distal to said loop, each said front faces being faceted such that said front faces are absent of a substantial planar surface lying in a plane being orientated parallel to an axis of rotation of said loop, said front face having a width greater than 0.10 inches and a height greater than 0.30 inches, said front face of each of said teeth being a leading face of said teeth extending into soil when said loop is positioned on the hub;
   each of said front and rear faces includes a set of soil engaging surfaces, each set of soil engaging surfaces includes;
      a first facet abutting said first side and a second facet abutting said second side, said first and second facets extending toward each other and intersecting a third facet, said first and second facets being angled away from said third facet at an angle greater than 45°;
      an apical facet extending downwardly toward said loop and outwardly from said apex to intersect said first, second and third facets; and
      wherein said first and second facets are substantial planar surfaces and said third and apical facets do not form substantial planar surfaces.

2. The apparatus according to claim 1, wherein said channels are a same distance from said inner surface with respect to each other, a distance between said channels being equal to between 0.40 inches and 0.60 inches.

3. The apparatus according to claim 1, wherein said loop has a plurality of breaks therein dividing said loop into a plurality of sections, said sections being frictionally coupled together to allow said sections to be removed from each other.

4. The apparatus according to claim 1, wherein said inner surface has a radius between 4.75 inches and 5.10 inches.

5. The apparatus according to claim 1, wherein said channels have a distal edge and a proximal edge with respect to said inner surface, said proximal edges forming a circle having a radius between 5.16 inches and 5.24 inches, said distal edges forming a circle having a radius between 5.32 inches and 5.40 inches.

6. The apparatus according to claim 1, wherein each of said teeth has a height between 0.75 inches and 2 inches.

7. The apparatus according to claim 1, wherein a juncture is positioned between and extends between each pair of adjacent ones of said teeth such that a plurality of junctures is defined, each of said junctures including a raised area extending between respective ones of said teeth, said raised area having lateral edges being angled down from a central ridge of said raised area.

8. A furrow closing wheel attachment apparatus for positioning on a hub of a furrow closer, said apparatus comprising:
- a closed loop having an inner surface, an outer surface, a first lateral surface and a second lateral surface, said inner surface forming a circle, said closed loop having a pair of channels therein, each of said first and second lateral surfaces having one of said channels therein extending along and being coextensive with a respective one of said first and second lateral surfaces, wherein flanges positioned on the hub are extendable into said channels to couple the hub to said loop, said channels being a same distance from said inner surface with respect to each other, a distance between said channels being equal to between 0.40 inches and 0.60 inches, said loop having a plurality of breaks therein dividing said loop into a plurality of sections, said sections being frictionally coupled together to allow said sections to be removed from each other, said inner surface having a radius between 4.75 inches and 5.10 inches, said channels having an distal edge and a proximal edge with respect to said inner surface, said proximal edge forming a circle having a radius between 5.16 inches and 5.24 inches, said distal edge forming a circle having a radius between 5.32 inches and 5.40 inches;
- a plurality of teeth being attached to and extending upwardly from said outer surface, said teeth being spaced from each other and positioned around said loop, each of said teeth having a front face, a rear face, a first side, a second side and an apex positioned distal to said loop, each of said rear and front faces being faceted such that each of said rear and front faces are absent of a substantial planar surface lying in a plane being orientated parallel to an axis of rotation of said loop, said front and rear faces each having a width greater than 0.10 inches and a height greater than 0.30 inches, said front face of each of said teeth being a leading face of said teeth extending into soil when said loop is positioned on the hub;
- each of said front and rear faces including a set of soil engaging surfaces, each set of soil engaging surfaces includes;
  - a first facet abutting said first side and a second facet abutting said second side, said first and second facets extending toward each other and intersecting a third facet, said first and second facets of said pair being angled away from said third facet at an angle greater than 45';
  - an apical facet extending downwardly toward said loop and outwardly from said apex to intersect said first, second and third facets;
  - wherein said first and second facets are substantial planar surfaces and said third and apical facets do not form substantial planar surfaces;
- each of said teeth having a height between 0.75 inches and 2.0 inches; and
- a juncture being positioned between and extending between each pair of adjacent ones of said teeth such that a plurality of junctures is defined, each of said junctures including a raised area extending between respective ones of said teeth, said raised area having lateral edges being angled down from a central ridge of said raised area.

\* \* \* \* \*